US005565260A

United States Patent [19]

Hawk

[11] Patent Number: 5,565,260

[45] Date of Patent: Oct. 15, 1996

[54] METHOD AND APPARATUS FOR COATING STRIP MATERIAL AND ORNAMENTALLY COATED MATERIAL PRODUCED THEREBY

[75] Inventor: T. Daniel Hawk, Sidney, Ohio

[73] Assignee: Aluminum Company of America, Pittsburgh, Pa.

[21] Appl. No.: 427,475

[22] Filed: Apr. 24, 1995

[51] Int. Cl.[6] .............................. B32B 3/00; B32B 27/06

[52] U.S. Cl. .......................... 428/195; 427/280; 427/286; 427/287; 427/388.1; 427/428; 428/220; 428/458

[58] Field of Search .................................... 427/209, 210, 427/211, 264, 265, 266, 278, 286, 287, 409, 410, 428, 280, 388.6; 428/195, 220, 458

[56] References Cited

U.S. PATENT DOCUMENTS

| | | | |
|---|---|---|---|
| 3,839,514 | 10/1974 | Nauta | 264/139 X |
| 3,902,942 | 9/1975 | Vecchiarelli | 156/145 |
| 4,352,771 | 10/1982 | Szabo | 264/210.2 |
| 4,378,390 | 3/1983 | Yoshida et al. | 427/428 |
| 4,387,123 | 6/1983 | Wollam et al. | 427/286 |
| 4,503,802 | 3/1985 | Keller et al. | 118/249 |
| 5,173,143 | 12/1992 | Fujii et al. | 156/290 |
| 5,338,572 | 8/1994 | Montagna | 427/309 |

*Primary Examiner*—Michael Lusignan
*Attorney, Agent, or Firm*—David W. Brownlee

[57] ABSTRACT

A method for coating strip material by applying polymer resin having a high solids content to at least one face of strip material with a coating roll having a pattern of grooves in the surface of the roll and curing the polymer resin on said strip.

24 Claims, 2 Drawing Sheets

METHOD AND APPARATUS FOR COATING STRIP MATERIAL AND ORNAMENTALLY COATED MATERIAL PRODUCED THEREBY

FIELD OF THE INVENTION

This invention relates to polymer coated strip material and such a metal strip, and in particular to coated metal strip having an ornamental design such as striations in the coating. In accordance with this invention, the coating is applied to the metal strip by a grooved roll which produces a pattern in the coating.

DESCRIPTION OF THE PRIOR ART

It is known to manufacture extruded vinyl sheets having a pattern such as a wood grain formed in the surface of the sheet by grooved rolls. It is also known to manufacture vinyl coated metal strip in which the vinyl has striations formed in its surface by a smooth roll. The striations are formed by "stringers" of vinyl which are produced by vinyl temporarily adhering to the smooth roll and metal strip. The stringers on the metal sheet extend longitudinally of the strip and form a random pattern of peaks and valleys in the vinyl which remain after curing of the vinyl on the strip.

It is desired to provide a method for producing an improved coated metal strip having a polymer coating on it with a specifically designed pattern.

It is also desired to provide a method for manufacturing a coated metal strip having an ornamental texture to the coating which is a polyester instead of vinyl or polyvinyl chloride. An improved polyester coated metal strip with an ornamental texture such as striations in the coating is also desired.

SUMMARY OF THE INVENTION

This invention meets the need for a coated metal strip having an ornamental pattern such as striations formed in a polyester coating on the strip. This invention also meets the need for a method and apparatus for forming such a coated metal strip, which is especially well suited for use in trim products for use on exterior surfaces of buildings such as residential houses such as around windows, doors, corners and other features on the houses. The strip can also be used as siding on such houses or other building units, facing sheets for doors such as garage or other entry doors, panels for appliances, and facing sheets for walls or the like.

This invention utilizes a polymer such as a polyester having a high solids content in the range of 50 to 70% by volume and preferably about 58 to 60% by volume and 71 to 73% by weight. The invention uses a grooved roll to apply the polymer on a cleaned metal strip, preferably an aluminum alloy strip. The grooved roll preferably has a rubber or synthetic rubber outer layer in which the grooves are formed. The grooves are especially designed with sufficient depth and appropriate spacing between the grooves to produce the desired variations in the coating thickness such as peaks and valleys in the polymer which will have the desired definition (height and width) when the polymer is cured on the strip.

An ornamental pattern of striations can be produced in coated metal strip of this invention to match the pattern of striations in siding products such as vinyl siding so the two products can be applied on the same structure and will match one another to provide an aesthetically pleasing appearance.

Coated strip metal of this invention can have either a single polymer coating on it or can have two or more layers of coatings on it. The layers can be different colors to enhance the appearance of the strip. For example, the metal may have a first smooth coating of one color and an outer patterned coating of a different color applied over the smooth coating so the base coat will show through in the valleys and thereby produce a more prominent or distinctive pattern on the strip.

One advantage of this invention is that it provides a method for coating metal strip with a polyester coating having an ornamental pattern such as striations in the coating.

Another advantage of this invention is that it facilitates the manufacture of coated metal strip having an ornamental pattern which repeats along the length of the strip.

A further advantage of this invention is that the coating can be designed to match the pattern of striations in other products which are used on the same building unit. For inspection purposes, a template can be provided to check the ornamental pattern in the coating.

A further advantage of this invention is that it provides a coated metal strip with a striated pattern in a thin coating of polyester on the sheet.

Another advantage of this invention is that it provides coated metal strip with an ornamental pattern in the coating wherein the coating has increased color and gloss retention, increased weatherability and increased mar resistance.

The above and other objects and advantages will become apparent from the following descriptions and the drawings attached hereto.

DESCRIPTION OF THE PREFERRED EMBODIMENT

Figure 1:
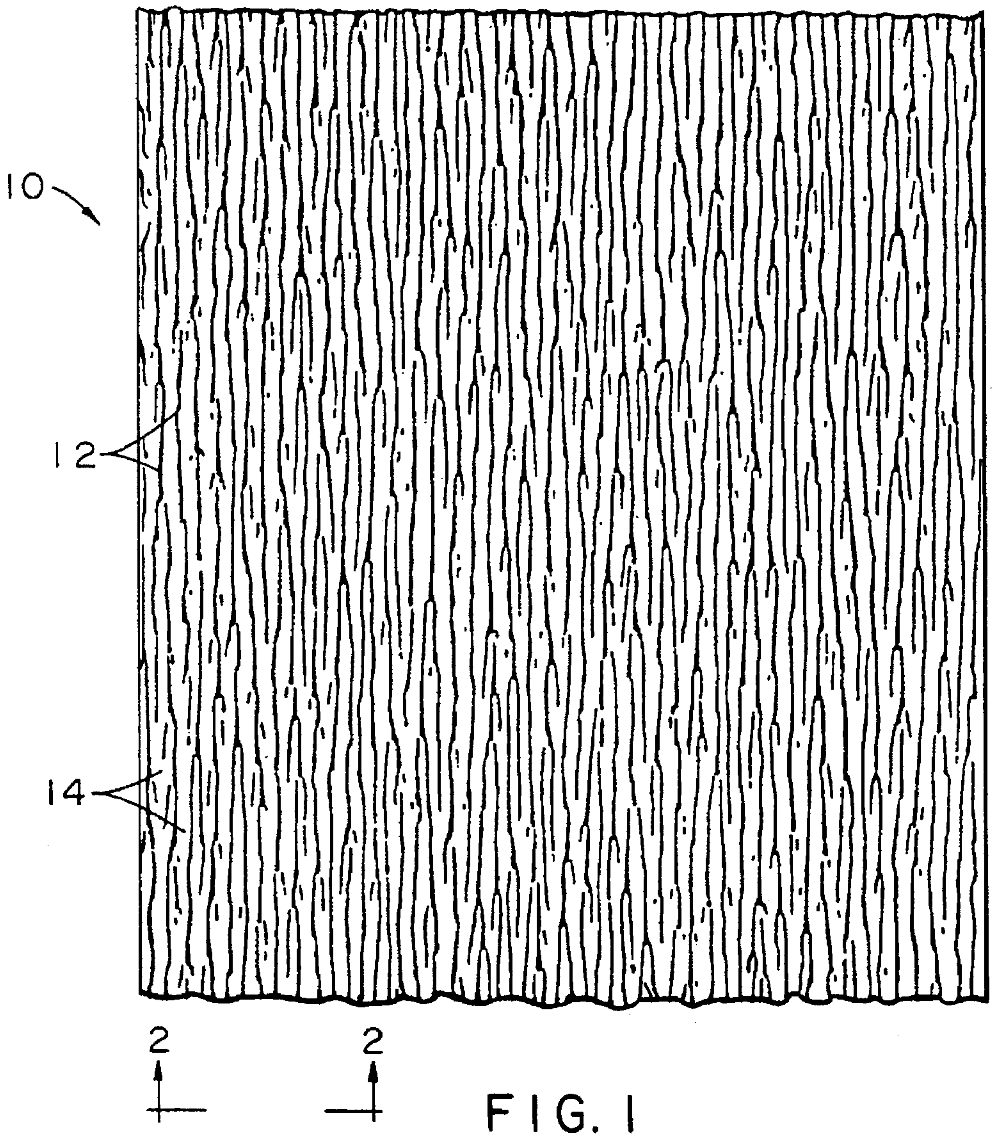
FIG. 1 is a plan view of a piece of coated metal strip of this invention showing an ornamental pattern of the striations in the coating on the strip.

Referring to the drawings, FIG. 1 shows a typical ornamental pattern of striations in a polyester coating on a coated metal strip 10 of this invention. This strip 10 is especially adapted for use as trim around windows, doors or the like on buildings such as residential housing units. The striations comprise a plurality of ridges 12 and valleys 14 that extend along the length of the strip. The striations create the appearance and feel of a texture or grain, such as a wood grain, on the surface of the strip 10. The striations can be designed and produced to match the grain on other building products which are intended for use on the same building unit. Other ornamental patterns of different thicknesses of coating can also be provided by this invention.

Figure 2:
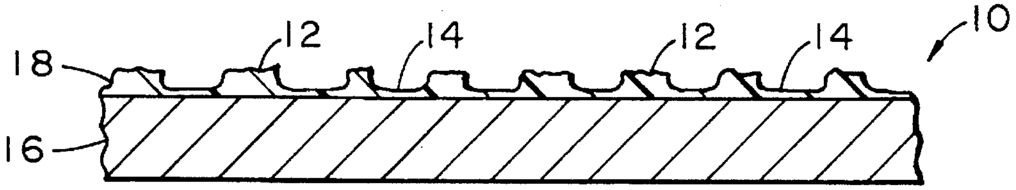
FIG. 2 is an enlarged cross-sectional view through a portion of the strip of FIG. 1 showing the peaks and valleys in the coating on the strip.

FIG. 2 is an enlarged cross section through the coated strip showing the metal portion 16 and the coating 18 on it. The metal strip 16 can be aluminum, steel, copper or other metal, but is preferably an aluminum alloy such as 3105 in a temper such as H19 or H29 or the like as designated by the Aluminum Association. The strip may be of a variety of widths and thicknesses with a typical width being about 48 inches and a typical thickness being in a range of about 0.014 to 0.024 inch, and more particularly about 0.0168 inch. The metal strip is typically cleaned and may be treated, before being coated, to improve adherence of the coating to the strip. For example, aluminum strip may be cleaned with an alkaline solution, rinsed and treated with a chrome or non-chrome conversion coating. A preferred cleaning and treatment is with a non-chrome treatment such as Betz MetChem® cleaner and pretreatment materials. Betz MetChem® is a trademark of Betz Laboratories, Inc. of Horsham, Pa.

The coating 18 on the strip is preferably a polyester having a high solids content and high viscosity before curing. A preferred polyester resin for use in the production of striated coated strip of this invention is a polyester coating composition which is available from Morton International in Chicago, Ill. Morton's specifications for the coating include a package viscosity of 10,000 to 15,000 cps Brookfield # at 77° F., 72±1% solids by weight, 59±1% solids by volume, 11.8±0.1 lbs per gallon, 3.25% V.O.C. (ASTMD 2369) and a flash point of 104° F. Other polyester or polyester/PVC blends with similar properties may also be used. For example, a polyester coating may contain approximately 2% PVC. Other resins that may be used in coating strip metal in accordance with this invention include PVC, water borne acrylics, epoxy, polyvinylidene fluoride (PVDF) and urethane, among others.

As shown in FIGS. 1 and 2, the ridges 12 and valleys 14 in the coating 18 have a high degree of texture or definition which enhances the appearance and feel of the coated strip. The ridges 12 preferably have widths in a range of about 0.0045 to 0.090 inch with an average width of about 0.030 inch, and heights above the valleys in a range of about 0.001 to 0.004 inch with an average height of about 0.002 inch. The valleys preferably are about 0.002 to 0.120 inch wide. It is important that there be approximately 9–14 ridges per inch across the width of the strip, and most preferably an average of about 12 ridges per inch. The coating is preferably about 0.0005 to 0.0008 inch thick in the valleys. A typical coating may have thicknesses of about 0.0006 inch in the thinnest areas and about 0.0020 to 0.0025 inch in thickest areas.

Although FIG. 2 shows only one coating 18 on the strip, this invention also contemplates and includes multiple layers of coating on the strip. One embodiment, not shown, has a base layer of one color on the metal and a top patterned layer of the same or different color over the base layer. The coating in the valleys in the top layer is thin enough for the color of the base coat to show through and thereby provide a more distinctive appearance for the coated strip. The base coat may be lighter or darker than the top coat, but is preferably lighter than the top coat. The base coat may be a different composition from the top coat and less expensive than the top coat.

Figure 3:
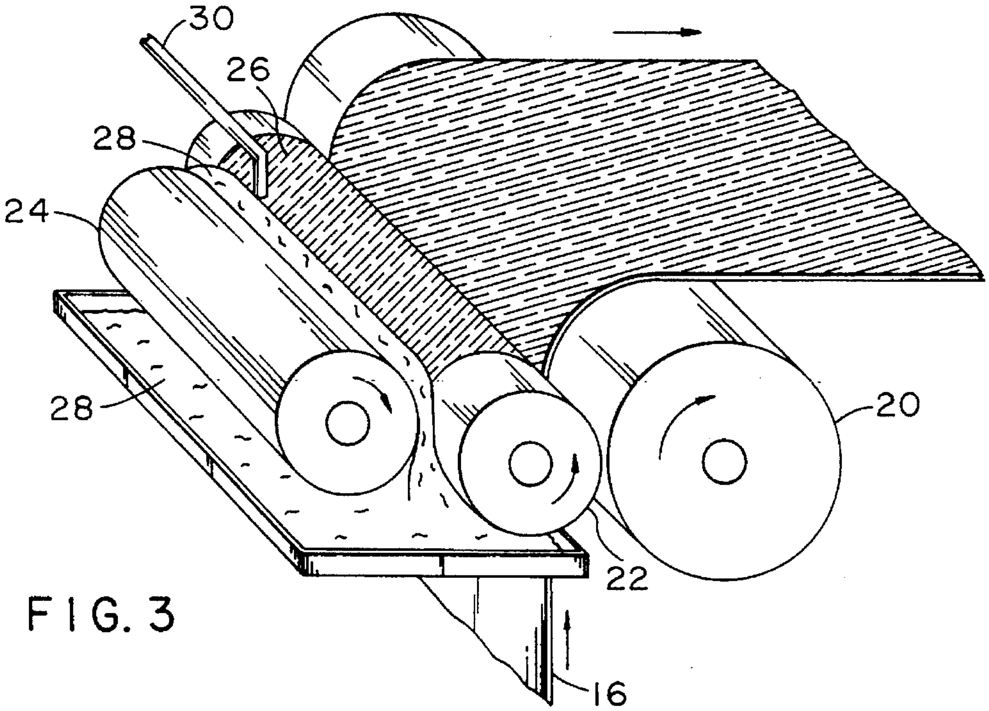
FIG. 3 is a schematic view showing a method and apparatus for coating metal strip in accordance with this invention.

FIG. 3 shows one embodiment of apparatus for coating metal strip in accordance with this invention. The apparatus includes a support roll 20, an application or coating roll 22 and a metering roll 24. The coating roll 22 has a plurality of grooves 26 in its surface for applying a pattern of polyester resin to the metal strip 16. The coating roll 22 is especially designed to form the desired ridges and valleys in the resin coating which is applied to the metal strip. The coating roll 22 may have an outer sleeve or shell on it which is made of elastomeric material. The grooves in the outer shell preferably have a pattern which will produce the desired ridges and valleys in the resin which the roll applies to a metal strip. In the practice of this invention, the grooves in the coating roll 22 are about 0.006 to 0.012 inch deep, and preferably about 0.008 inch deep. The grooves are about 0.025 to 0.040 inch wide, and preferably about 0.035 inch wide. The width of the land between grooves depends on the particular pattern to be produced, but may be about 0.020 to 0.095 inch with an average width of about 0.055 inch.

Grooved elastomeric rolls suitable for use in this invention are available from Mosstype Corporation in Waldwick, N.J. Such rolls preferably have an outer shell or layer of elastomeric material on them having a durometer hardness of about 35–80, and more preferably about 55–65. The elastomeric shell may have a thickness in a range of about 1–5 or more inches, and preferably about 2 inches thick. The elastomeric material may comprise a urethane alloy which is designed for solvent resistance and is available from American Roller Company which has offices in Cincinnati, Ohio and Chicago, Ill. The grooves in the elastomeric material can be made by laser engraving with an electronically stored pattern which allows for making slight modifications of pattern length for rolls of different diameters, as when a roll is reconditioned by removal of the outer roll surface by grinding or cutting followed by engraving a new pattern in the roll surface. The engraving can also be formed by mechanical engraving techniques. It is believed that grooved metal or ceramic rolls can also be used for some applications of this invention.

In the operation of the apparatus of FIG. 3, uncoated metal strip 16 moves vertically upwardly between rolls 20 and 22 to have liquid or semi-liquid polyester resin 28 coated on the strip. The resin 28 is fed from a feed line 30 to flow into the nip between rolls 22 and 24 and thus onto roll 22 for application to the metal strip. It is important to control the amount of resin 28 that is applied to the metal strip. This is effected by controlling the amount of resin 28 which is applied to the coating roll 22. The amount of resin which is applied to the grooved coating roll 22 is determined by, among other things, the depth and width of the grooves in the roll 22, the hardness or durometer of the material from which roll 22 is made, the pressure between rolls 22 and 24, and the nature of the resin 28, particularly the solids content and the viscosity of the resin.

In accordance with this invention, the semi-liquid polyester resin must have sufficient content of solids such as about 60–80%, and preferably about 70%, by weight or about 50–70%, and preferably about 58%, by volume and an approximately high viscosity of at least about 10,000 cps Brookfield #6 at 77° F. so the semi-liquid resin will retain the pattern of ridges and valleys until the coating is cured in such pattern. If the resin is too thin (not enough solids) and/or too low in viscosity, the resin will flow after application to the strip, before it is cured, and will not have the desired texture after it is cured.

Figure 4:
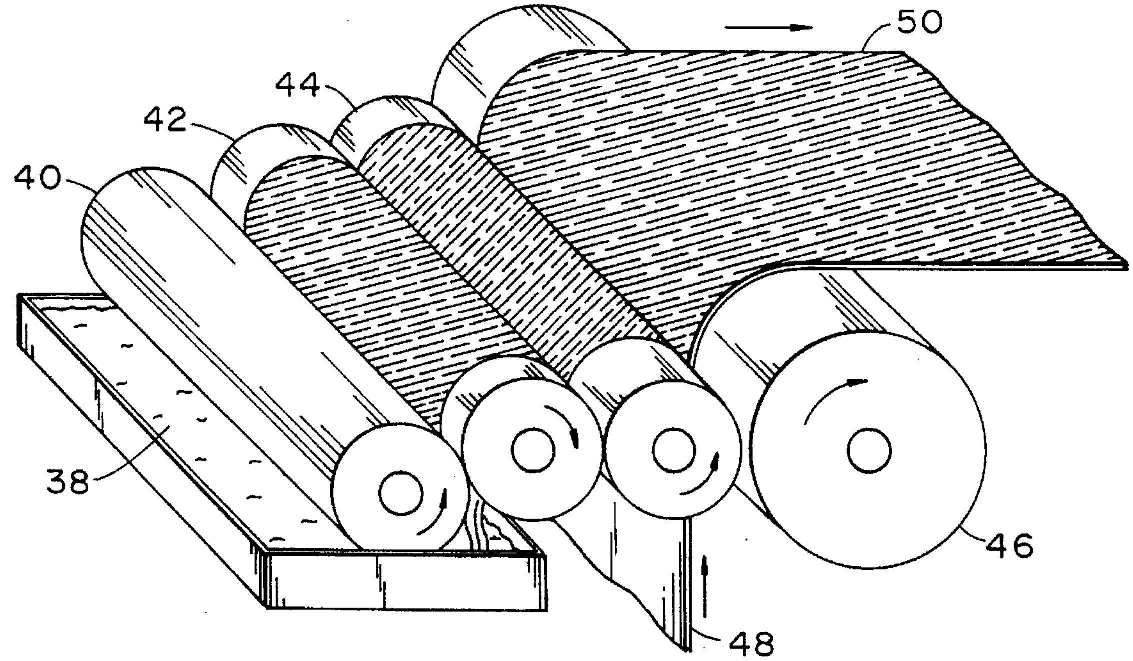
FIG. 4 is a schematic view showing an alternative method and apparatus for coating metal strip in accordance with this invention.

FIG. 4 shows an alternative embodiment of apparatus for applying a striated coating on metal strip in accordance with this invention. The apparatus of FIG. 4 includes a pick-up roll 40, a grooved roll 42, a transfer roll 44, and a back-up roll 46. The grooved roll 42 is textured with an ornamental pattern of grooves like roll 22 shown in FIG. 3. With this system, the pick-up roll 40 applies a metered amount of resin 38 onto the grooved roll 42 to fill the grooves and apply a thin layer of resin between the grooves. The grooved roll 42 transfers the pattern of resin on the transfer roll 44 which transfers it to the strip material 48 to produce coated strip material 50.

It is therefore seen that this invention provides an improved coated metal strip with an ornamental design such as striations in the surface of the coating. The invention also provides a method and apparatus for forming such a strip. It will be apparent to those skilled in the art that the invention includes alternative modes for practicing the invention in addition to those illustrated and described herein. The appended claims are intended to cover all modes and embodiments which fall within the spirit of the invention.

What is claimed is:

1. A method for coating strip material having striations in the surface of the coating comprising:

providing strip material adapted to be coated on at least one face thereof with a polymer coating;

applying polymer resin having a solids content of at least about 50% by volume of the polymer resin to at least one face of said strip with a coating roll having grooves in the surface of the roll for forming a striated pattern of the polymer resin on the metal surface; and curing said polymer resin on said strip.

2. A method as set forth in claim 1 in which said polymer resin is a polyester that contains approximately 58 to 60% by volume solids and has a viscosity of about 10,000 to 15,000 cps Brookfield #6 at 77° F.

3. A method as set for in claim 1 in which said coating roll has an elastomeric outer layer thereon which has said grooves therein.

4. A method as set for in claim 1 in which said polymer coating is a polyester which is applied to said strip in a thickness in the range of 0.0005 to 0.0025 inch.

5. A method as set for in claim 1 in which said strip has a base coat on it of a first color and an outer striated layer of said polyester resin of a same or different color over said base coat.

6. A method as set for in claim 1 in which the amount of polyester resin applied to said strip is controlled by metering liquid polyester resin onto said coating roll.

7. A method as set for in claim 1 in which said strip is an aluminum alloy strip.

8. Metal strip material roll coated by the method of claim 1 having an ornamental pattern of striations in a polyester coating on at least one face of the strip material which is repeated along the length of the strip.

9. A method for coating strip metal comprising:

applying polyester resin having a solids content of at least 50% and a viscosity of about 10,000 to 15,000 cps Brookfield #6 at 77° F. onto at least one face of a metal strip in a pattern of different thicknesses of resin and curing said resin on the strip in a ornamental pattern.

10. A method as set forth in claim 9 in which said resin is applied onto the metal strip in peaks and valleys having thicknesses varying from about 0.0005 to 0.0025 inches.

11. A method for coating a metal strip comprising:

a) applying a polymer resin onto a grooved coating roll having a plurality of axially spaced, circumferentially extending grooves;

b) transferring said striated coating from said coating roll to an outer face of a metal strip to thereby form a striated coating comprising alternating ridges and valleys; and c) curing said striated coating on the metal strip.

12. A method as set forth in claim 11, in which said resin is a polyester having a solids content of about 70 to 74% by weight and a viscosity of about 10,000 to 15,000 cps Brookfield #6 at 77° F.

13. A method as set forth in claim 11 in which said resin is transferred from the grooved coating roll to a smooth transfer roll which applies the coating onto the metal strip.

14. Strip material roll coated on at least one face with polyester having an ornamental pattern of striations in its surface which is repeated along the length of said strip, said striations comprising ridges and valleys of predetermined design extending along the length of said strip.

15. Strip material as set forth in claim 14 in which said material is an aluminum alloy.

16. Metal strip as set forth in claim 15 in which said ridges have an average width in a range of 0.0045 to 0.090 inch.

17. Metal strip as set forth in claim 16 in which said coating has a thickness in a range of about 0.0005 to 0.0008 inch in said valleys.

18. Metal strip as set forth in claim 15 in which there are approximately 9–14 ridges per inch across the width of the strip.

19. Metal strip as set forth in claim 15 which has a base coating thereon under said polyester coating and said base coating has a different color from said polyester coating.

20. Metal strip as set forth in claim 14 in which said polyester is made from a polyester resin having a solids content of about 60 to 80% by weight and a viscosity of about 10,000 to 15,000 cps Brookfield #6 at 77° F.

21. Metal strip as set forth in claim 14 in which striations provide a wood grain appearance.

22. Metal strip as set forth in claim 14 in which said polyester contains about 1–5% by weight of polyvinyl chloride.

23. Metal strip as set forth in claim 14 in which said polyester contains about 2% polyvinyl chloride.

24. Metal strip as set forth in claim 14, in which said stations comprise a plurality of valleys and ridges with said valleys having average widths in a range of 0.002 to 0.120 inch and said ridges having average heights above said valleys in a range of 0.001 to 0.004 inch.

* * * * *

UNITED STATES PATENT AND TRADEMARK OFFICE

CERTIFICATE OF CORRECTION

PATENT NO. : 5,565,260

DATED : October 15, 1996

INVENTOR(S) : Daniel T. Hawk

It is certified that error appears in the above-indentified patent and that said Letters Patent is hereby corrected as shown below:

| | |
|---|---|
| Col. 5, line 41, Claim 8 | Delete "Metal strip" and insert --Strip--. |
| Col. 6, line 21, Claim 14 | Delete "predetermined" and insert --selected--. |
| Col. 6, line 25, Claim 16 | Delete "Metal strip" and insert --Strip material--. |
| Col. 6, line 27, Claim 17 | Delete "Metal strip" and insert --Strip material--. |
| Col. 6, line 30, Claim 18 | Delete "Metal strip" and insert --Strip material--. |
| Col. 6, line 33, Claim 19 | Delete "Metal strip" and insert --Strip material--. |
| Col. 6, line 36, Claim 20 | Delete "Metal strip" and insert --Strip material--. |
| Col. 6, line 40, Claim 21 | Delete "Metal strip" and insert --Strip material--. |

UNITED STATES PATENT AND TRADEMARK OFFICE

CERTIFICATE OF CORRECTION

PATENT NO. : 5,565,260

DATED : October 15, 1996

INVENTOR(S) : Daniel T. Hawk

It is certified that error appears in the above-indentified patent and that said Letters Patent is hereby corrected as shown below:

| | |
|---|---|
| Col. 6, line 42, Claim 22 | Delete "Metal strip" and insert --Strip material--. |
| Col. 6, line 45, Claim 232 | Delete "Metal strip" and insert --Strip material--. |
| Col. 6, line 47, Claim 24 | Delete "Metal strip" and insert --Strip material--. |

Signed and Sealed this

Twelfth Day of August, 1997

Attest:

Bruce Lehman

BRUCE LEHMAN

*Attesting Officer*

*Commissioner of Patents and Trademarks*